United States Patent [19]
Choi

[11] Patent Number: 5,844,968
[45] Date of Patent: Dec. 1, 1998

[54] INTERFACING BETWEEN INDEPENDENT VOICE MAIL SYSTEM AND EXCHANGE

[75] Inventor: Hyung-Woon Choi, Ahnyang, Rep. of Korea

[73] Assignee: SamSung Electronics Co., Ltd., Suwon, Rep. of Korea

[21] Appl. No.: 718,728

[22] Filed: Sep. 24, 1996

[30] Foreign Application Priority Data

Sep. 29, 1995 [KR] Rep. of Korea ............... 1995 33109

[51] Int. Cl.$^6$ .................................................. H04M 1/64
[52] U.S. Cl. ............................................. 379/89; 379/67
[58] Field of Search .................................. 379/67, 68, 84, 379/88, 89, 158, 165

[56] References Cited

U.S. PATENT DOCUMENTS

| | | | |
|---|---|---|---|
| 5,083,308 | 1/1992 | Gaulke et al. | 379/381 |
| 5,175,761 | 12/1992 | Khalid et al. | 379/89 |
| 5,195,128 | 3/1993 | Knitl | 379/67 |
| 5,222,124 | 6/1993 | Castaneda et al. | 379/67 |
| 5,222,125 | 6/1993 | Creswell et al. | 379/67 |
| 5,260,986 | 11/1993 | Pershan | 379/67 |
| 5,335,266 | 8/1994 | Richardson, Jr. et al. | 379/88 |
| 5,349,636 | 9/1994 | Irribarren | 379/89 |
| 5,351,276 | 9/1994 | Doll, Jr. et al. | 379/67 |
| 5,422,936 | 6/1995 | Atwell | 379/88 |
| 5,450,488 | 9/1995 | Pugaczewski et al. | 379/67 |
| 5,455,852 | 10/1995 | Elrod et al. | 379/67 |
| 5,463,676 | 10/1995 | Ohsawa | 379/67 |
| 5,471,523 | 11/1995 | Smith et al. | 379/67 |

*Primary Examiner*—Daniel S. Hunter
*Attorney, Agent, or Firm*—Robert E. Bushnell, Esq.

[57] ABSTRACT

An interfacing apparatus, which allows communication between an exchange and an independent voice mail system using a serial transmission interface device includes: a switching unit for performing a switching function for the formation of a communication path between a subscriber of the exchange and an independent voice mail system; a serial transmission interface connected to the switching unit for serially transmitting an input call message and for performing interfacing operations; an independent voice mail system connected to the serial transmission interface for rendering service of various voice guiding messages based on the call message, and a central processing unit for controlling the switching unit and serial transmission interface and for controlling the transmission of a call message to the independent voice mail system via the serial transmission interface when the call message is received in the independent voice mail system.

12 Claims, 6 Drawing Sheets

INTERFACING BETWEEN INDEPENDENT VOICE MAIL SYSTEM AND EXCHANGE

CLAIM OF PRIORITY

This application makes reference to, incorporates the same herein, and claims all benefits accruing under 35 U.S.C. §119 from an application for Interfacing Apparatus And Method Between Independent Voice Mailing System And Exchange System earlier filed in the Korean Industrial Property Office on 29 Sep. 1995 and there duly assigned Ser. No. 33109/1995.

BACKGROUND OF THE INVENTION

1. Field of the Invention

The present invention relates to an independent voice mail system in an electronic exchange, and more particularly, to an interfacing apparatus which allows communication between the exchange and the independent voice mail system using a serial transmission interface device.

2. Description of the Related Art

Generally, an exchange system connected to a voice mail system renders the service of broadcasting various voice guiding messages (e.g., sequential oral menus) for incoming calls. In such a manner, when the voice mail system is operated by being connected to the exchange, the voice mail system is divided into two types according to its connection method with the exchange system; an independent type, and a compactly connected type.

An independent voice mail system is simply connected to a subscriber's line of the exchange, without a separate data transmission line therebetween, and is operated such that the exchange and he independent voice mail system are connected through separate data transmission lines. As the data transmission line, an RS232C interface is adopted. The compactly connected voice mail system transmits and receives various kinds of information to and from the exchange via the data transmission line. Thus, the compactly connected voice mail system can offer more various services than the independent voice mail system. If the independent voice mail system is connected to the exchange, the structure is simpler than that of the compactly connected system. However, the interfacing function between the independent voice mail system and the exchange is not offered at all. Accordingly, I have found that there is a need for an interface which can extend functions of the independent voice mail system by providing for the interface between the independent voice mail system and the exchange.

In an earlier independent voice mail system, a key telephone system includes a central processing unit (CPU) for controlling communication switching and for controlling various parts of the key telephone system, a read only memory having program and initial service data of the central processing unit for performing basic call functions and various other functions, a random access memory for temporarily storing the program of the central processing unit and processed data, a single line subscriber circuit for supplying communication currents of audio bands to a telephone set of a key telephone subscriber and for interfacing signals between the telephone set and the key telephone system under the control of the central processing unit, a switching circuit for switching various tones and various audio data under the control of the central processing unit, a tone generator for generating various tones under the control of the central processing unit and for outputting those tones to the switching circuit, a ring generator for generating the ring signal and for supplying the generated ring signal to a subscriber line via the single line subscriber circuit, a dual tone multi-frequency receiver for analyzing a multi-frequency code generated by the telephone set of the key telephone subscriber and for supplying the corresponding digital data to the central processing unit, a dual tone multi-frequency transmitter for generating the multi-frequency code under the control of the central processing unit and for outputting it to the switching circuit, an office line circuit for seizing an office line under the control of the central processing unit to form an office line communication loop and interfacing signal between the office line and the key telephone system, and a key telephone subscriber circuit for selectively connecting an extension line to an office line, supplying power to the key telephone and for interfacing signals between the extension line and key telephone system.

An independent voice mail system is connected to the single line subscriber circuit of the key telephone system. When a call for a subscriber switched in a message reception state is received in the independent voice mail system, the central processing unit transmits the subscriber's number to the independent voice mail system and thus, the independent voice mail system performs its own function.

In other words, interfacing between the key telephone system and the independent voice mail system is performed by connecting the voice mail system to the port of the single line subscriber circuit. I have noticed however, the system has problems because the interfacing speed is low and the interfacing precision is decreased. Also, the central processing unit recognizes a ring signal through the dual-tone multi-frequency receiver and dual-tone multi-frequency transmitter to control the single line subscriber circuit. Therefore, it has been my observation that since the dual-tone multi-frequency receiver and dual-tone multi-frequency transmitter of the key telephone system are used, if an error occurs therein, it is quite difficult to correct the error. Also, controlling the dual-tone multi-frequency receiver and dual-tone multi-frequency transmitter is complicated.

Exemplary efforts representation of contemporary practice with voice mail systems interfaced to exchanges having interfacing arrangement which allows communication between the exchange and independent voice mail system using a serial transmission interface include: U.S. Pat. No. 5,471,523 to Smith et al. entitled Telephone Call And Voice Processing System, U.S. Pat. No. 5,463,676 to Ohsawa entitled Key Telephone System With a Voice Storage Equipment, U.S. Pat. No. 5,455,852 to Elrod et al. entitled Method And Apparatus For Defining Parameter Transmission Protocols For A Call Intercept/Message Delivery Telephone System, U.S. Pat. No. 5,450,488 to Pugaczewski et al. entitled Multiple Service Voice Messaging System, U.S. Pat. No. 5,422,936 to Atwell entitled Enhanced Message Service Indication, U.S. Pat. No. 5,351,276 to Doll Jr. et al. entitled Digital/Audio Interactive Communication Network, U.S. Pat. No. 5,349,636 to Irribarren entitled Interface System And Method For Interconnecting A voice Message System And An Interactive Voice Response System, U.S. Pat. No. 5,335,266 to Richardson Jr. et al. entitled Automated Telecommunication Peripheral System, U.S. Pat. No. 5,260,986 to Pershan entitled Group Notification Service And System, U.S. Pat. No. 5,222,125 to Creswell et al. entitled System For Providing Personalized Telephone Calling Features, U.S. Pat. No. 5,195,128 to Knitl entitled Communication System, Particularly A Telephone Communication System, U.S. Pat. No. 5,175,761 to Khalid et al. entitled Call Transfers By Voice Messaging System (VMS) Integrated To A Private Branch Exchange, and U.S. Pat. No. 5,083,308 to Gaulke et al. entitled Arrangement For Determining Switch Port Status At An Adjunct Processor.

SUMMARY OF THE INVENTION

Therefore, it is an object of the present invention to provide an improved independent voice mail system.

It is another object to provide a technique for interfacing an independent voice mail system to an exchange, which allows faster interfacing therebetween.

It is still another object to provide a technique for interfacing an independent voice mail system to an exchange, which allows more simply controlled interfacing therebetween.

These and other objects may be attained with an interfacing apparatus for an exchange. The interfacing apparatus may be constructed with a switching circuit performing a switching function to form of a communication path between a subscriber of the exchange and an independent voice mail system, and a serial transmission interface connected to the switching circuit for serially transmitting an input call message and for performing an interfacing operation. The independent voice mail system is connected to the serial transmission interface in order to render service by issuing various voice guiding messages based on the call message. A central processing unit (CPU) controls the switching circuit and serial transmission interface and controls the transmission of a call message to the independent voice mail system via the serial transmission interface when the call message is received in the independent voice mail system.

Also, according to another aspect of the present invention, there is provided a method of interfacing an independent voice mail system to an exchange, wherein the exchange, a serial transmission interface and the independent voice mail system are positioned serially, by receiving from a subscribers of the exchange a request for a call message to be transmitted to the independent voice mail system; detecting the presence of a port for the formation of a communication path in the independent voice mail system; transmitting a call message to the independent voice mail system via the serial transmission interface if it has been detected in the detecting step that a port for the formation of a communication path is present; and performing an operation of the independent voice mail system having received the call message based on said call message.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
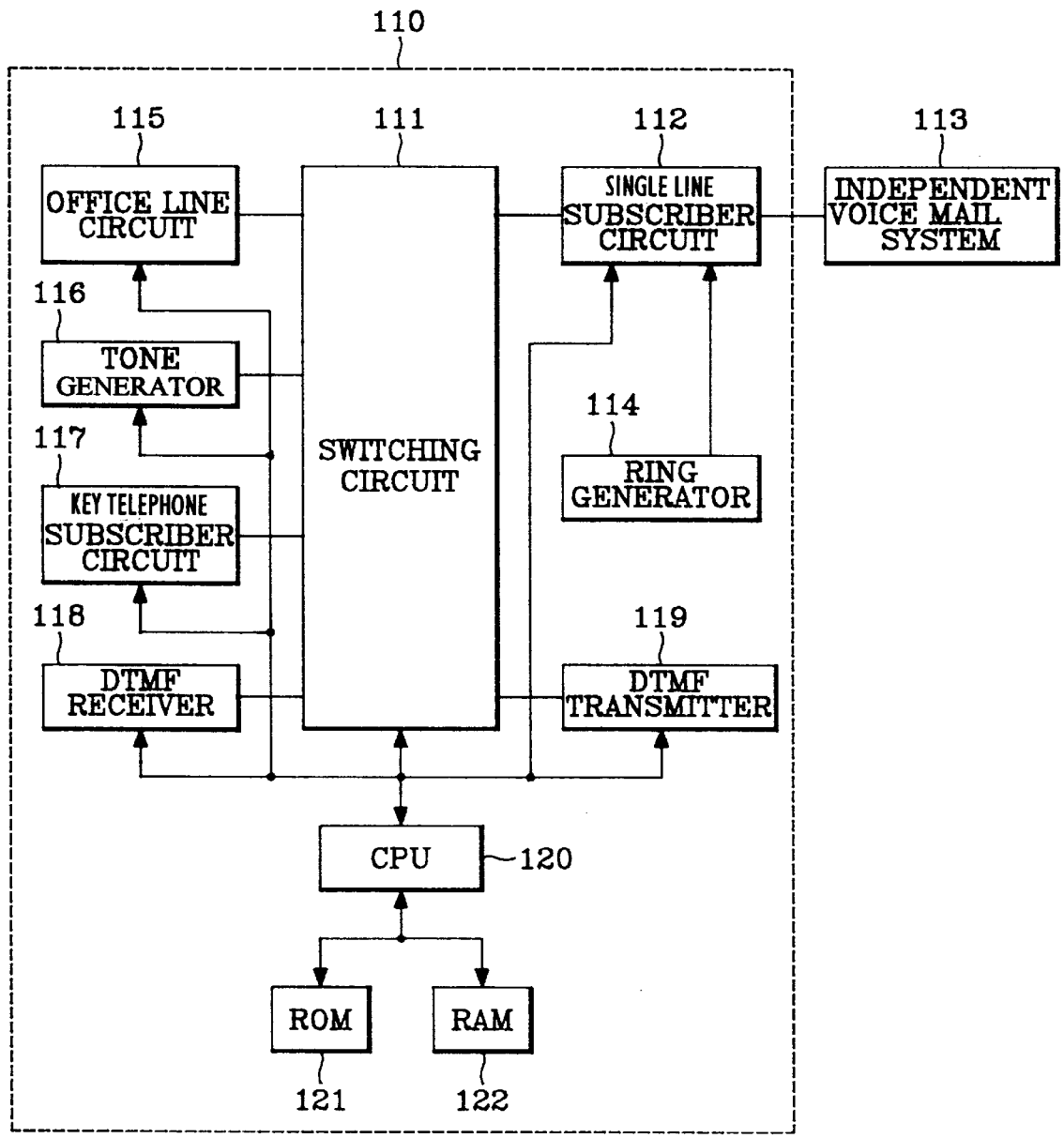
FIG. 1 is a block diagram of a hypothetical representation of an earlier independent voice mail system connected to a key telephone system.

FIG. 1 is a block diagram of an earlier independent voice mail system connected to a key telephone system, in which a key telephone system 110 includes a central processing unit (CPU) 120 for controlling communication switching and for controlling various parts of the key telephone system 110, a read only memory (ROM) 121 having program and initial service data of the central processing unit 120 for performing basic call functions and various other functions, a random access memory (RAM) 122 for temporarily storing the program of the central processing unit 120 and processed data, a single line subscriber circuit 112 for supplying communication current of audio bands to a telephone set of a key telephone subscriber and for interfacing signals between the telephone set and key telephone system 110 under the control of the central processing unit 120, a switching circuit 111 for switching various tones and various audio data under the control of the central processing unit 120, a tone generator 116 for generating various tones under the control of the central processing unit 120 and for outputting them to the switching circuit 111, a ring generator 114 for generating a ring signal and for supplying the generated ring signal to a subscriber line via the single line subscriber circuit 112, a dual tone multi-frequency (DTMF) receiver 118 for analyzing a multi-frequency code (MFC) generated by the telephone set of the key telephone subscriber and for supplying the corresponding digital data to the central processing unit 120, a dual tone multi-frequency transmitter 119 for generating the multi-frequency code under the control of the central processing unit 120 and for outputting it to the switching circuit 111, an office line circuit 115 for seizing an office line under the control of the central processing unit 120 to form an office line communication loop and interfacing signal between the office line and the key telephone system 110, and a key telephone subscriber circuit 117 for selectively connecting an extension line to an office line, supplying power to the key telephone and for interfacing signals between the extension line and key telephone system 110.

An independent voice mail system 113 is connected to the single line subscriber circuit 112 of the key telephone system 110.

The system shown in FIG. 1 is described in more detail as follows. When a call for a subscriber switched in a message reception state is received in the independent voice mail system 113, the central processing unit 120 transmits the subscriber's number to the independent voice mail system 113. Thus, the independent voice mail system 113 performs its own function.

In other words, interfacing between the key telephone system 110 and independent voice mail system 113 is performed by connecting the voice mail system to the port of the single line subscriber circuit 112. However, the system has problems in that the interfacing speed is low and the interfacing precision is decreased. Also, the central processing unit 120 recognizes a ring signal through the dual tone multi-frequency receiver 118 and dual tone multi-frequency transmitter 119 to control the single line subscriber circuit 112. Therefore, since the dual tone multi-frequency receiver 118 and dual tone multi-frequency transmitter 119 of the key telephone system 110 are used, if an error occurs therein, it is quite difficult to correct the error. Also, controlling the dual tone multi-frequency receiver 118 and dual tone multi-frequency transmitter 119 is complicated.

Figure 2:
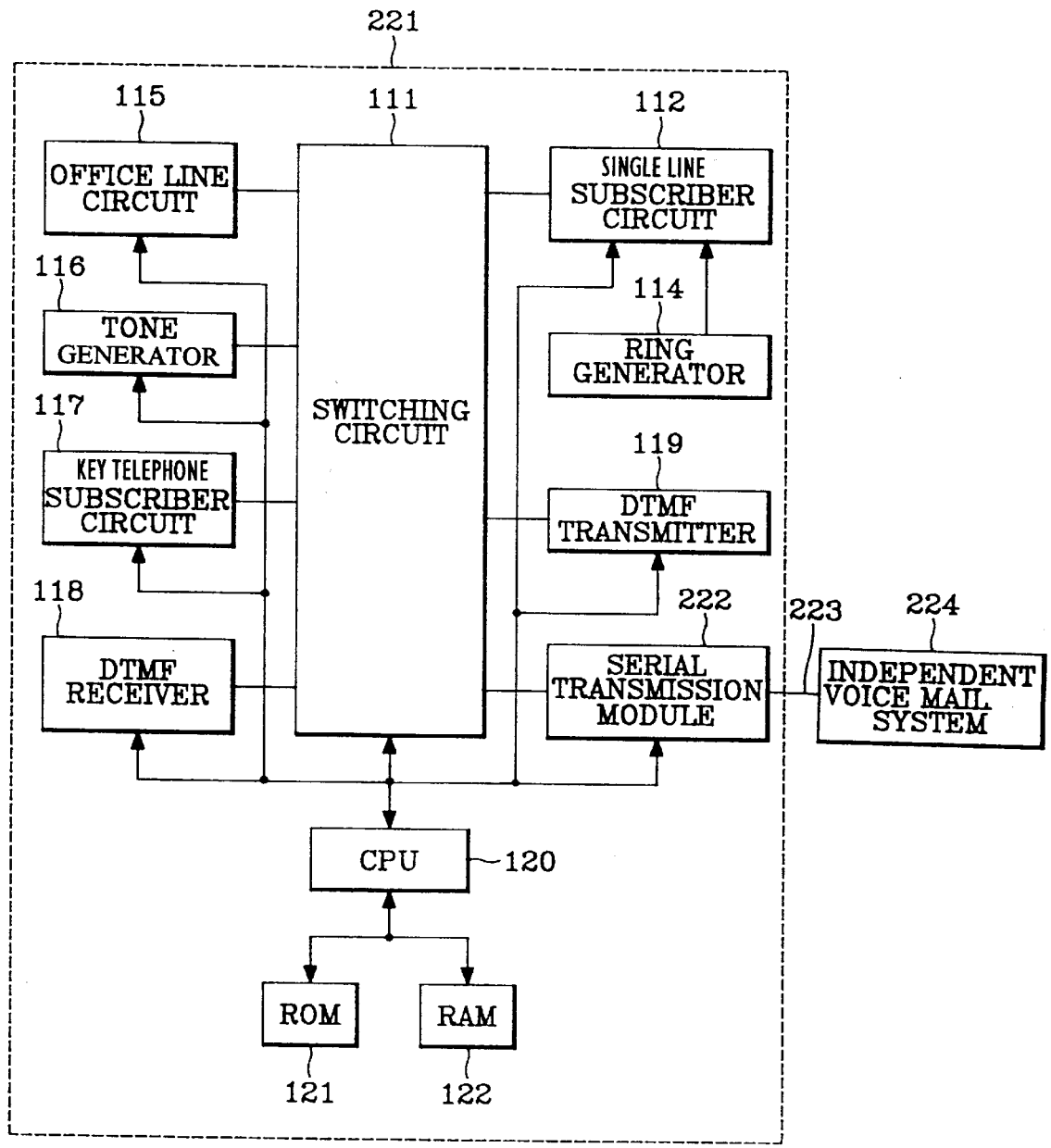
FIG. 2 is a block diagram of a key telephone system including an interfacing apparatus interposed between an independent voice mail system and an exchange, according to the present invention.

Referring to FIG. 2, which shows a key telephone system including an interfacing apparatus between an independent voice mail system and an exchange, according to the present invention, a key telephone system 221 according to the present invention includes a central processing unit 120 for controlling communication switching and for controlling various parts of the key telephone system 221, a ROM 121 having program and initial service data of the central processing unit 120 for performing basic call functions and various other functions, a RAM 122 for temporarily storing the program of the central processing unit 120 and processed data, a single line subscriber circuit 112 for supplying communication current of audio bands to a telephone set of a key telephone subscriber and for interfacing signals between the telephone set and key telephone system 221, under the control of the central processing unit 120, a switching circuit 111 for switching various tones and various audio data under the control of the central processing unit 120, a tone generator 116 for generating various tones under the control of the central processing unit 120 and for outputting them to the switching circuit 111, a ring generator 114 for generating a ring signal and for supplying the generated ring signal to a subscriber line via the single line subscriber circuit 112, a dual tone multi-frequency receiver 118 for analyzing a multi-frequency code (MFC) generated by the telephone set of the key telephone subscriber and for supplying the corresponding digital data to the central processing unit 120, a dual tone multi-frequency transmitter 119 for generating the multi-frequency code under the control of the central processing unit 120 and for outputting it to the switching circuit 111, an office line circuit 115 for seizing an office line under the control of the central processing unit 120 to form an office line communication loop and interfacing signal between the office line and key telephone system 221, a key telephone subscriber circuit 117 for selectively connecting an extension line to an office line, supplying power to the key telephone and interfacing signals between the extension line and key telephone system 211, and a serial transmission module 222 for serially transmitting an input message under the control of the central processing unit 120.

An RS232C line 223, disposed between the key telephone system 221 and the independent voice mail system 224, is connected to the serial transmitting module 222, and the independent voice mail system 224 is connected to the RS232C line 223.

Figure 3A:
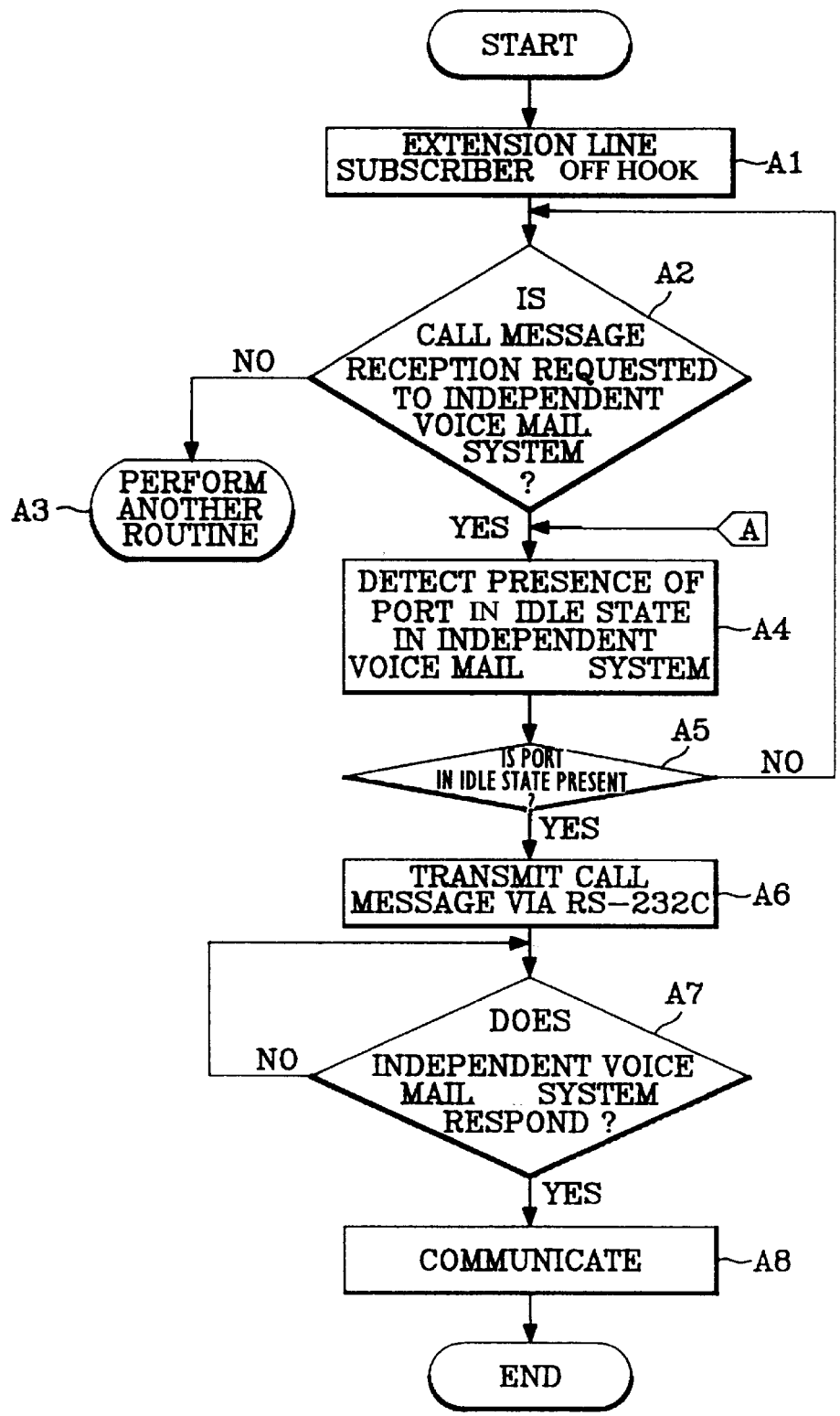
FIGS. 3A through 3D are flowcharts showing the interfacing process that occurs between the independent voice mail system and an exchange in accordance with the principles of the present invention.

First, referring to FIG. 3A, an extension line subscriber of the exchange takes his telephone set off the hook in a step A1. Then, when a call message reception is requested for the independent voice mail system 224 in a step A2, a ring back tone is transmitted to an extension line caller. The central processing unit 120 detects in a step A4 whether a port in an idle state is present in the independent voice mail system 120. If a port in an idle state is not present in the independent voice mail system 120, then the process returns to the step A2. Thus, the extension line caller continues to hear the ring back tone.

However, if it has been determined that a port in an idle state is present in the independent voice mail system 120 in the step A5, then the central processing unit 120 transmits the call message via the serial transmitting module 222 and the RS232C line 223 in step A6. The call message is composed of a format such as those indicated in the following Table 1.

TABLE 1

Example 1:
CR LF MD MDN MDT AC RCV SP SND SP CR LF CY
Example 2:
CR LF MD MDN MDT AC RCV SP SP CR LF CY
Example 3
CR LF MD MDN MDT AC SP SND SP CR LF CY From the above table 1, examples 1, 2 and 3 are illustrative embodiments for the call message. A carriage return (CR) and a line feed (LF)indicative of data signals are positioned in the first stage of the data format of the call message. A control Y (CY) is a vacant space for control operation, an ASCII space (SP) is a space for an ASCII code. A message desk number (N) represents a port address of the independent voice mail system 224 of destination with the numbers of 001 through 999. A message desk terminal (MDT) represents a complementary control identification code with the numbers of 0001 through 9999, which is used only upon necessity thereof Also, a receiver (RCV) represents a dialed number of a called party, and a sender (SND) represents a dialed number of a calling party. Also, an action code (AC) is a message indicative of various operational states. The AC message is classified by a direct call (D) which is a direct call receiving code, a forward all calls (A) which is a call message reception request code from the calling party to the independent voice mail system 224, a forward on busy (B) which is a code representing that a subscriber to be connected is on busy line, a forward on no answer (N) which is a code representing that there is no answer to a dialed number from the subscriber to be connected, a disconnect code (C) which is a code representing that the port of the independent voice mail system 224 is on a busy state when the calling party requests a call message reception to the independent voice mail system 224, and a forward reason unknown (U) which is a code representing other states.

If the call message composed as above is received in the independent voice mail system 224 in a step A6, the independent voice mail system 224 performs necessary operations by itself in response to the call message in a step A7. In other words, in a step A8, a communication path is formed between the extension line caller and independent voice mail system 224, thereby entering into a communication state.

Figure 3B:
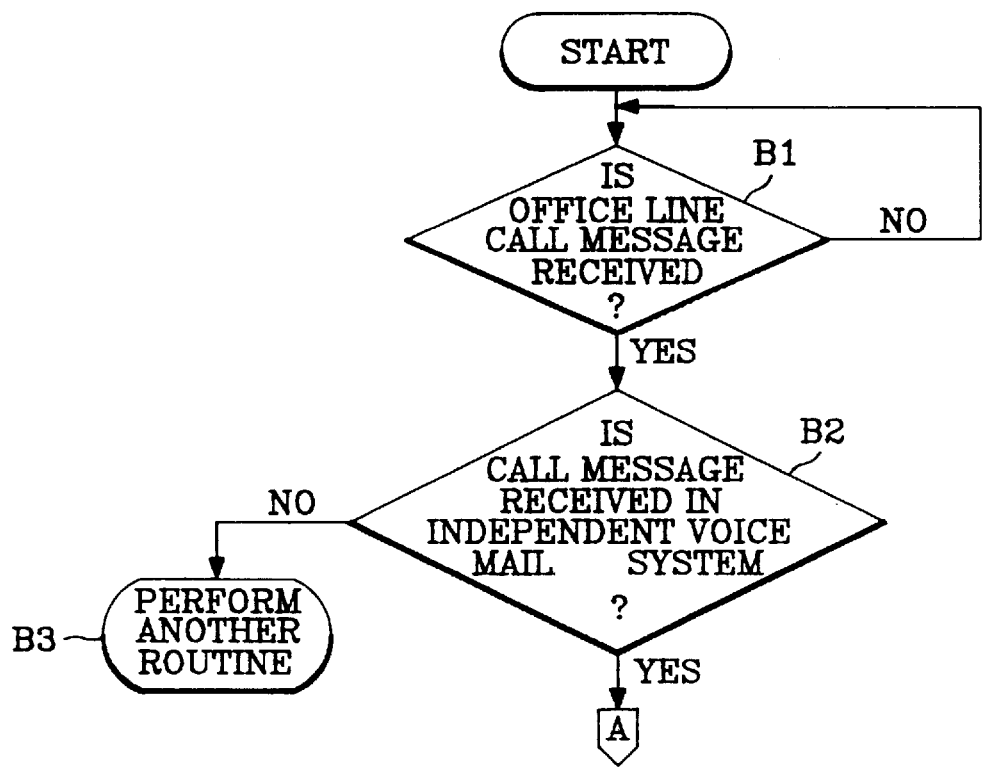

Secondly, referring to FIG. 3B, if an office line message for call message reception from an office line subscriber of the exchange is received in a step B1, the step B1 is transferred to a step B2. After performing a call message reception request to the independent voice mail system 224 in the step B2, the step B2 is transferred to a step A4. In other words, during an office line call message reception, the call message is automatically received in the independent voice mail system 224.

Figure 3C:
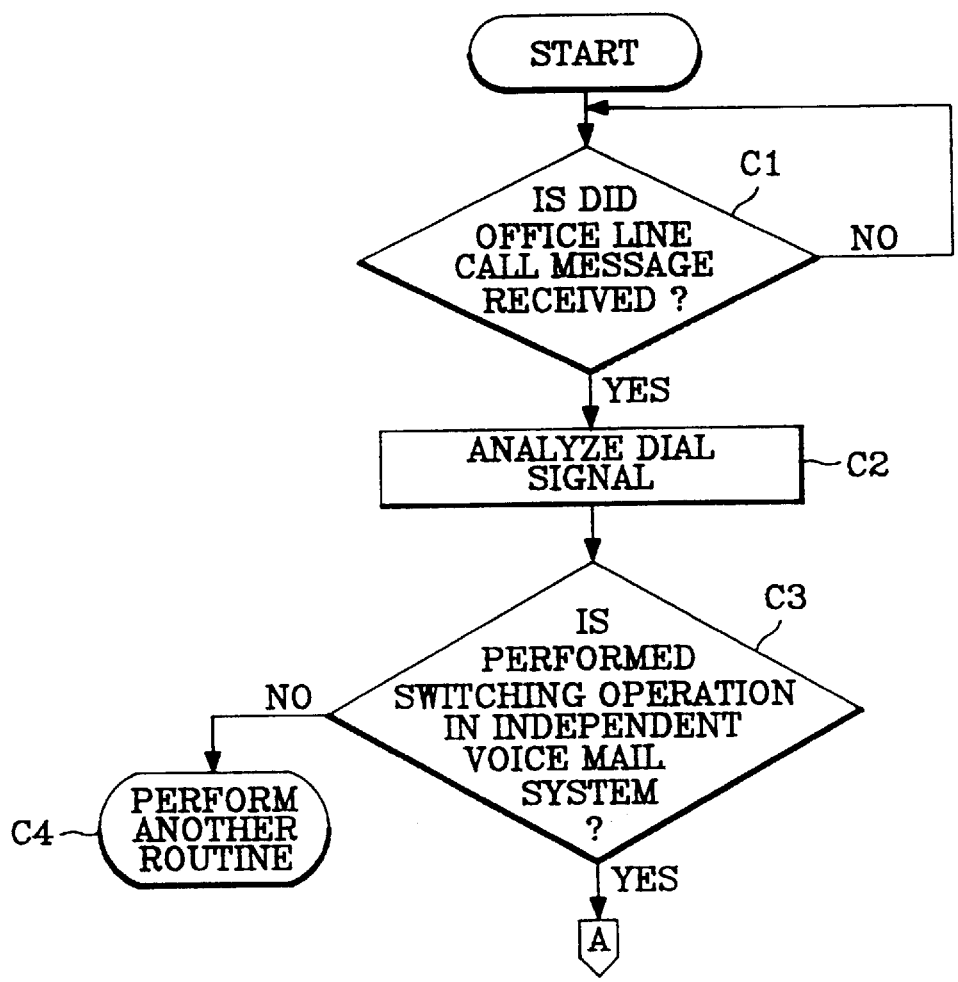

Third, referring to FIG. 3C, the office line call message is received via a direct inward dialing (DID) in a step C1, and then the step C1 is transferred to a step C2. In the step C2, the central processing unit 120 analyzes a dial signal input from an external subscriber having received the office line call message. If the dial signal is a signal requesting a call message reception to the independent voice mail system 224, the switching circuit 111 performs a switching operation with respect to the office line subscriber and independent voice mail system 224 in a step C3. Then, the step C3 is transferred to the step A4.

Figure 3D:
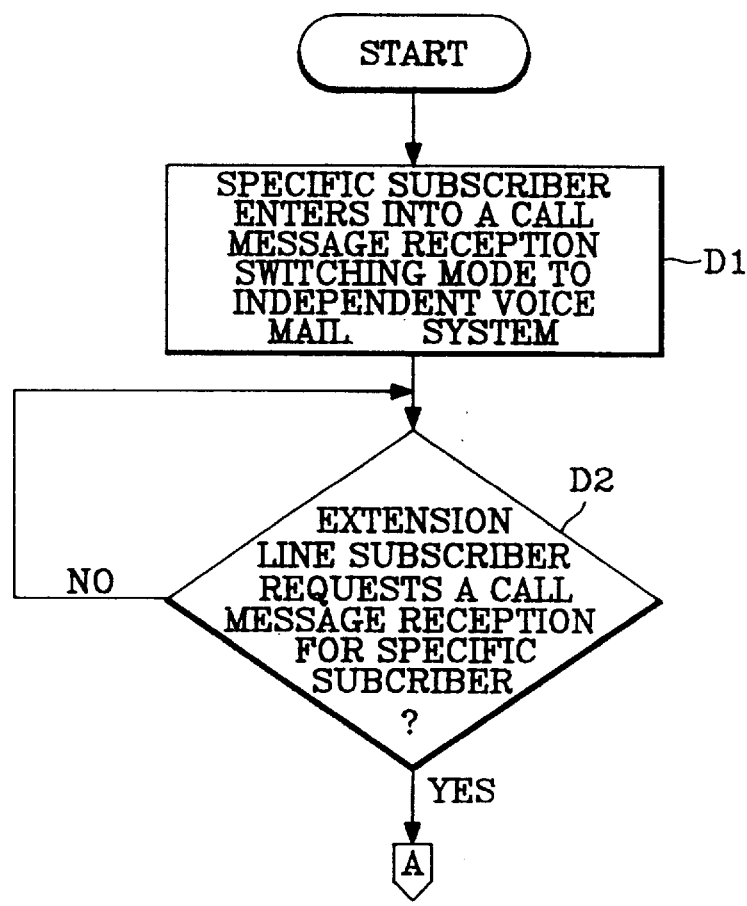

Fourth, referring to FIG. 3D, after entering into a call message reception switching mode for being automatically switched to the independent voice mail system 224 with respect to all ring signals for inputting a specific subscriber among extension line subscribers, in a step D1, the step D1 is transferred to a step D2. After another extension line subscriber takes his telephone set off the hook, the central processing unit 120 analyzes an input dial signal. If the extension line subscriber requests a call message reception for the specific subscriber, the step D2 is transferred to the step A4.

As described above, in the exchange using the independent voice mail system 224, before forming a communication path between the exchange and independent voice mail system 224, a necessary call message is transmitted to the independent voice mail system 224, thereby allowing a faster interface. Also, the reliability of data transmission is enhanced by transmitting the call message via a RS232C line 223. Furthermore, compared to the interface with the independent voice mail system 224 via the single line subscriber circuit 112, the dual tone multi-frequency receiver 118 and the dual tone multi-frequency transmitter 119, the interface for the exchange according to the present invention is more simply controlled.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An interfacing apparatus for an exchange, comprising:
   a switching unit for performing a switching function for the formation of a communication path between a subscriber of the exchange and an independent voice mail system;
   a serial transmission interface unit connected to said switching unit for serially transmitting an input call message and for performing an interfacing operation;
   said independent voice mail system connected to said serial transmission interface for rendering service of various voice guiding messages based on said call message; and
   a central processing unit for controlling said switching unit and said serial transmission interface and for controlling the transmission of said call message to said independent voice mail system via said serial transmission interface when said call message is received in said independent voice mail system.

2. An interfacing apparatus for an exchange, as claimed in claim 1, said serial transmission interface transmitting said call message comprised of a predetermined data format having a destination, an address of said independent voice mail system, a dial number of a calling subscriber, a dial number of a called subscriber, a message indicative of communication of said called subscriber, a message indicative of disconnection, and a message indicative of a ring signal response.

3. A method of interfacing an independent voice mail system to an exchange, wherein said exchange, a serial transmission interface and said independent voice mail system are positioned serially, said method comprising the steps of:
   receiving from a subscriber of said exchange a request for a call message to be transmitted to said independent voice mail system;
   detecting the presence of a port for the formation of a communication path in said independent voice mail system;
   transmitting said call message to said independent voice mail system via said serial transmission interface if it has been detected in said detecting step that a port for the formation of a communication path is present; and
   performing an operation of said independent voice mail system having received said call message based on said call message.

4. A method of interfacing, as claimed in claim 3, said call message transmitted by said serial transmission interface comprised of a predetermined data format having a destination, an address of said independent voice mail system, a dial number of a calling subscriber, a dial number of a called subscriber, a message indicative of communication of said called subscriber, a message indicative of disconnection, and a message indicative of a ring signal response.

5. A method of interfacing an independent voice mail system to an exchange, wherein said exchange, a serial transmission interface and said independent voice mail system are positioned serially, said method comprising the steps of:
   receiving from an extension line subscriber of said exchange a request for a call message to be transmitted to said independent voice mail system;
   detecting the presence of a port for the formation of a communication path in said independent voice mail system;
   transmitting said call message to said independent voice mail system via said serial transmission interface if it has been detected in said detecting step that a port for the formation of a communication path is present; and
   performing an operation of said independent voice mail system having received said call message based on said call message.

6. A method of interfacing, as claimed in claim 5, said call message transmitted by said serial transmission interface comprised of a predetermined data format having a destination, an address of said independent voice mail system, a dial number of a calling subscriber, a dial number of a called subscriber, a message indicative of communication of said called subscriber, a message indicative of disconnection, and a message indicative of a ring signal response.

7. A method of interfacing an independent voice mail system to an exchange, wherein said exchange, a serial transmission interface and said independent voice mail system are positioned serially, said method comprising the steps of:
   receiving from an office line subscriber of said exchange a request for a call message to be transmitted to said independent voice mail system;
   detecting the presence of a port for the formation of a communication path in said independent voice mail system;
   transmitting said call message to said independent voice mail system via said serial transmission interface if it has been detected in said detecting step that a port for the formation of a communication path is present; and
   performing an operation of said independent voice mail system having received said call message based on said call message.

8. A method of interfacing, as claimed in claim 7, said call message transmitted by said serial transmission interface comprised of a predetermined data format having a destination, an address of said independent voice mail system, a dial number of a calling subscriber, a dial number of a called subscriber, a message indicative of communication of said called subscriber, a message indicative of disconnection, and a message indicative of a ring signal response.

9. A method of interfacing an independent voice mail system to an exchange, wherein said exchange, a serial transmission interface and said independent voice mail system are positioned serially, said method comprising the steps of receiving from an office line subscriber of said exchange a directly dialed request for a call message to be transmitted to said independent voice mail system;

detecting the presence of a port for the formation of a communication path in said independent voice mail system;

transmitting said call message to said independent voice mail system via said serial transmission interface if it has been detected in said detecting step that a port for the formation of a communication path is present; and performing an operation of said independent voice mail system having received said call message based on said call message.

10. A method of interfacing, as claimed in claim 9, said call message transmitted by said serial transmission interface comprised of a predetermined data format having a destination, an address of said independent voice mail system, a dial number of a calling subscriber, a dial number of a called subscriber, a message indicative of communication of said called subscriber, a message indicative of disconnection, and a message indicative of a ring signal response.

11. A method of interfacing an independent voice mail system to an exchange, wherein said exchange, a serial transmission interface and said independent voice mail system are positioned serially, said method comprising the steps of:

receiving from a specific called party, one of a plurality of extension line subscribers of said exchange, a request for setting a reception switching mode in said independent voice mail system;

receiving from an extension line subscriber of said exchange a request for a call message to be transmitted to said specific called party;

detecting the presence of a port for the formation of a communication path in said independent voice mail system;

transmitting said call message to said independent voice mail system via said serial transmission interface if it has been detected in said detecting step that a port for the formation of a communication path is present; and performing an operation of said independent voice mail system having received said call message based on said call message.

12. A method of interfacing, as claimed in claim 11, said call message transmitted by said serial transmission interface comprised of a predetermined data format having a destination, an address of said independent voice mail system, a dial number of a calling subscriber, a dial number of a called subscriber, a message indicative of communication of said called subscriber, a message indicative of disconnection, and a message indicative of a ring signal response.

\* \* \* \* \*